(12) United States Patent
Forsyth

(10) Patent No.: US 6,422,103 B1
(45) Date of Patent: Jul. 23, 2002

(54) COMPACT FRONT WHEEL DRIVE SIX-SPEED TRANSAXLE

(75) Inventor: John R. Forsyth, Romeo, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/603,029

(22) Filed: Jun. 26, 2000

(51) Int. Cl.$^7$ .................................................. F16H 3/08
(52) U.S. Cl. ......................................... 74/331; 475/207
(58) Field of Search ................................. 74/331, 333

(56) References Cited

U.S. PATENT DOCUMENTS

| | | |
|---|---|---|
| 4,558,607 A | 12/1985 | Szodfridt |
| 4,640,141 A | 2/1987 | Knodel et al. |
| 5,311,789 A | 5/1994 | Henzler et al. |
| 5,385,065 A | 1/1995 | Hofmann |
| 5,495,775 A | 3/1996 | Lees et al. |
| 5,591,097 A * | 1/1997 | Petri et al. .................. 475/207 |
| 5,662,543 A | 9/1997 | Forsyth |
| 5,697,250 A | 12/1997 | Ahluwalia et al. |
| 5,704,247 A | 1/1998 | Ahluwalia et al. |
| 5,704,866 A | 1/1998 | Pritchard et al. |
| 5,718,300 A | 2/1998 | Frost |
| 5,722,291 A | 3/1998 | Fraley et al. |
| 5,735,175 A | 4/1998 | Forsyth |
| 5,743,141 A | 4/1998 | Forsyth |
| 5,830,099 A | 11/1998 | Forsyth |
| 5,904,632 A | 5/1999 | Brown et al. |
| 5,871,883 A * | 10/1999 | Klemen ...................... 475/296 |
| 6,023,987 A | 2/2000 | Forsyth |
| 6,067,870 A | 5/2000 | Fleishman et al. |

* cited by examiner

*Primary Examiner*—Dirk Wright
(74) *Attorney, Agent, or Firm*—Harness, Dickey & Pierce, P.L.C.

(57) ABSTRACT

A compact manual transaxle includes an input shaft having a fixed transfer gear, a reduction shaft having two reduction gears, one of which meshing with the transfer gear, a mainshaft having three input gears and an output shaft supporting three speed gears meshing with the three input gears. The transaxle further includes a pair of synchronizer clutches for establishing a direct and a reduction gearset flow path, and a pair of synchronizer clutches for establishing the forward gear speed ratios by selectively coupling the three speed gears to the output shaft. A reverse gear assembly is provided for establishing a reverse gear. A locking mechanism is provided for selectively inhibiting rotation of a carrier assembly of the reverse gear assembly so as to cause the output to be driven in an opposite direction relative to the input for providing a reverse gear.

21 Claims, 8 Drawing Sheets

|  | FIRST SYNCHRONIZED CLUTCH 80 | SECOND SYNCHRONIZED CLUTCH 88 | THIRD SYNCHRONIZED CLUTCH 96 | FOURTH SYNCHRONIZED CLUTCH 104 |
|---|---|---|---|---|
| 1ST | YES | NO | YES | NO |
| 2ND | NO | YES | YES | NO |
| 3RD | YES | NO | YES | NO |
| 4TH | YES | NO | NO | YES |
| 5TH | NO | YES | YES | NO |
| 6TH | NO | YES | NO | YES |
| REVERSE | NO | YES | NO | NO |

COMPACT FRONT WHEEL DRIVE SIX-SPEED TRANSAXLE

BACKGROUND OF THE INVENTION

This invention relates generally to manual multi-speed transmissions of the type used in motor vehicles. More specifically, the present invention is directed to a compact manual transaxle having a locking differential for its reverse gear assembly.

Due to increasing consumer demand for front wheel drive vehicles with more powerful yet fuel-efficient drivetrains, the engine and transaxle must be efficiently packaged to take advantage of all available space within the engine compartment. Concomitantly, most modern transaxles must be capable of providing at least five forward speed ratios. As such, minimizing the overall axial length of the transaxle as well as its shaft center distances is of critical importance to the transmission designer. To meet these requirements, various "three-shaft" type transaxles have been developed that include an input shaft and a pair of output shafts each having an output pinion meshed with a drive gear fixed to the differential. A series of gearsets provided between the input shaft and one or both of the output shafts can be selectively engaged to deliver power from the input shaft to a pair of axle half-shafts secured to the differential. For example, U.S. Pat. Nos. 5,311,789, 5,385,065 and 5,495,775 each disclose this type of transaxle. Additionally, in many manual transmissions, sliding-type gearsets are commonly used for establishing the reverse gear. Alternatively, some manual transmissions are equipped with a synchronized reverse arrangement for preventing the undesirable grinding associated with conventional sliding-type arrangements. Exemplary synchronized reverse gear arrangements are disclosed in U.S. Pat. Nos. 4,558,607, 4,640,141 and 5,385,065. While such arrangements appear to satisfactorily perform their desired function, a need still exists to provide alternatives to conventional reverse gear arrangements.

A problem associated with the above-mentioned transaxle relates to the overall shaft length required. Another problem associated with the above-mentioned transaxle relates to the requirement that both of the output shafts be positioned "out-of-plane" relative to the plane extending through the input shaft and the differential. In particular, in order to maintain the center distance between the input shaft and the differential required for adequate axle shaft clearances, the transaxle's input shaft/output shaft center distance and its output shaft/differential center distance must be increased. This results in added geartrain mass and cost while also requiring increased synchronizer capacity.

Accordingly, while such conventional manual transaxle designs attempt to address the packaging requirements mentioned above, a need still exists for development of more compact and robust manual transaxles that can meet the demands of modem front wheel drive vehicular applications.

SUMMARY OF THE INVENTION

The primary object of the present invention is to provide a multi-speed manual transaxle that meets the above-noted needs and improves upon conventional designs.

To this end, the present invention is directed to a six-speed manual transaxle comprised of an input shaft having a transfer gear fixed thereto, a reduction shaft having a first reduction gear fixed thereto and meshed with the transfer gear and a second reduction gear rotatably supported thereon, an output shaft having an output gear fixed thereto and a mainshaft having a first input gear fixed thereto, a first speed gear rotatably supported on the output shaft and meshed with the first input gear, a second input gear fixed to the mainshaft and meshed with the second reduction gear, a second speed gear rotatably supported on the output shaft and meshed with the second input gear, a third input gear rotatably supported on the mainshaft, a third speed gear fixed to the output shaft and meshed with the third input gear, a first clutch and a second clutch for selectively coupling the input shaft to the output shaft directly or through a reduction gearset, a third clutch for selectively coupling either of the first and second speed gears to the output shaft, a fourth clutch for selectively coupling the third speed gear to the mainshaft, a locking mechanism operable in a first mode for permitting unrestricted rotation of a carrier assembly and a second mode for inhibiting rotation thereof, the locking mechanism is shifted into its second mode to reverse the direction of rotation of the output relative to the input, thereby establishing the reverse gear, a final drive gear meshed with the output gear, and a differential driven by the final drive gear. Since the mainshaft can be driven either directly or through a reduction gearset, each gear on the mainshaft can result in two different forward speed ratios of the output shaft. Thus, the three gears on the mainshaft produce six forward speed ratios.

BRIEF DESCRIPTION OF THE DRAWINGS

Further objects, features and advantages of the present invention will become apparent to those skilled in the transmission art from studying the following description and the accompanying drawings in which.

DETAILED DESCRIPTION OF THE INVENTION

Figure 1:
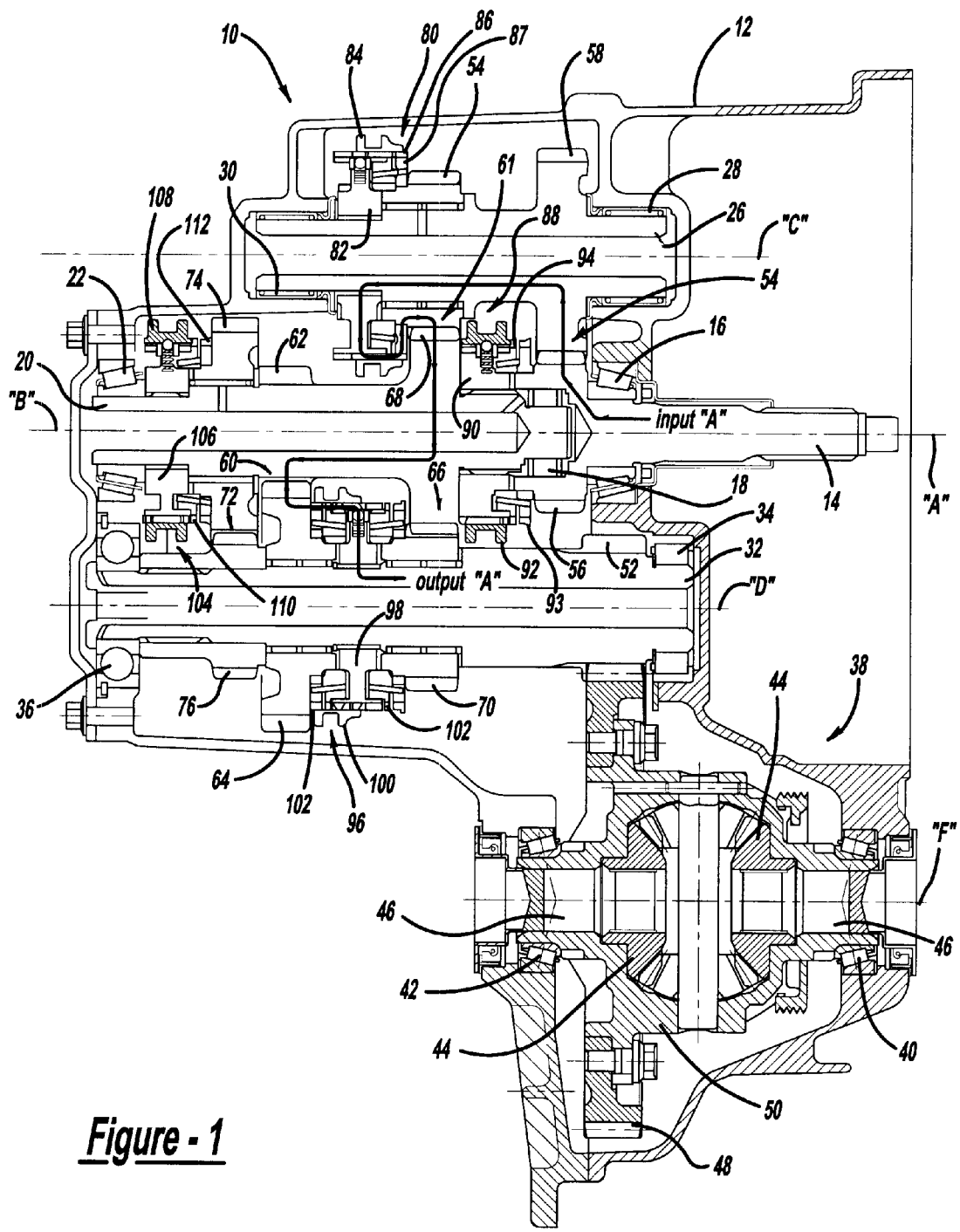
FIG. 1 is a sectional view of a six-speed manual transaxle constructed according to a preferred embodiment of the present invention illustrating the power flow in first gear.

Referring now to the drawings, a manual transaxle 10 is shown that is adapted for use in front wheel drive motor vehicles. Transaxle 10 is a multi-speed arrangement having all of its forward and reverse gears synchronized and yet is efficiently packaged to provide a compact gearbox.

Manual transaxle 10 is shown to include a housing 12 within which an input shaft 14 is rotatably supported by bearing sets 16 and 18 for rotation about a first axis "A". As is conventional, input shaft 14 is adapted to be driven through a suitable manually-released clutch (not shown) by the vehicle's engine. Manual transaxle 10 also includes a mainshaft 20 rotatably supported in housing 12 by bearing sets 18 and 22 for rotation about a second axis "B". Second axis "B" is the same as first axis "A". In addition, manual transaxle 10 includes a reduction shaft 26 rotatably supported in housing 12 by bearing sets 28 and 30 for rotation about a third axis "C" and an output shaft 32 rotatably supported in housing 12 by bearing sets 34 and 36 for rotation about a fourth axis "D". Manual transaxle 10 also includes a differential 38 supported in housing 12 by bearing sets 40 and 42 for rotation about a fifth axis "F". The output of differential 38 includes a pair of axially-aligned side gears 44 to which axle half-shafts 46 are secured in a conventional manner so as to connect differential 38 to the driving wheels of the motor vehicle. The input to differential 38 is a drive gear 48 that is fixed to a differential cage 50 and which is in constant meshed engagement with an output gear 52 fixed to output shaft 32. It will be appreciated that FIGS. 2–7 are so-called "unrolled" sectional views wherein shafts 14, 20, 26, 32 and 46 are all shown to be arranged in a single plane. However, in reality, these shafts are compactly arranged in a parallel relationship relative to each other such that the center distances between these shafts can be effectively minimized.

Manual transaxle 10 includes a series of constant-mesh gearsets that can be selectively engaged for establishing six forward speed ratios as well as a reverse speed ratio between input shaft 14 and output shaft 32. Because mainshaft 20 can be driven directly or through a reduction gearset, each gearset can result in two different speed ratios of output shaft 32. In this regard, two distinct series of power flow paths are generated. In the first series of power flow paths, the reduction gearset path, power flows through input shaft 14, reduction shaft 26, mainshaft 20 and output shaft 32. In this regard, first reduction gearset 54 is shown to include a first transfer gear 56 fixed to input shaft 14 and a first reduction gear 58 fixed to reduction shaft 26. First reduction gear 58 is in constant mesh with first transfer gear 56 for defining the first portion of the reduction flow path. The second portion of the reduction flow path is defined by a second reduction gearset 61 which includes a second reduction gear 59 rotatably supported for selective engagement with reduction shaft 26 and a second input gear 68 fixed to mainshaft 20. Second reduction gear 59 is in constant mesh with second input gear 68. In the second series of power flow paths, the direct path, power flows through input shaft 14, mainshaft 20 and output shaft 32.

As more specifically set forth in FIGS. 1–6, gearset 60 is shown to include a first input gear 62 fixed to mainshaft 20 and a first speed gear 64 rotatably supported for selective engagement with output shaft 32. First speed gear 64 is in constant mesh with first input gear 62 for defining a power transmission path that can be selectively engaged to establish a first or a second forward speed ratio.

In a similar manner, gearset 66 includes a second input gear 68 fixed to mainshaft 20 that is in constant mesh with a second speed gear 70 rotatably supported for selective engagement with output shaft 32. Thus, gearset 66 defines a power transmission path that can be selectively engaged to establish a third or a fifth forward speed ratio. As previously mentioned, second input gear 68 fixed to mainshaft 20 is also in constant mesh with second reduction gear 59 rotatably supported for selective engagement with reduction shaft 26.

Gearset 72 includes a third input gear 74 rotatably supported for selective engagement with mainshaft 20 that is in constant mesh with a third speed gear 76 fixed to output shaft 32. As such, gearset 72 defines a power transmission path that can be selectively engaged to establish a fourth and a sixth forward speed ratio.

To provide means for establishing the various forward and reverse speed ratios between input shaft 14 and output shaft 32 by selectively engaging one of the six available power transmission paths, each gearset is associated with a synchronizer clutch. More specifically, four synchronizer clutches are provided. Two synchronizer clutches establish the power flow path to be either direct or reduced. The other two synchronizer clutches establish the forward speed ratios.

Figure 2:
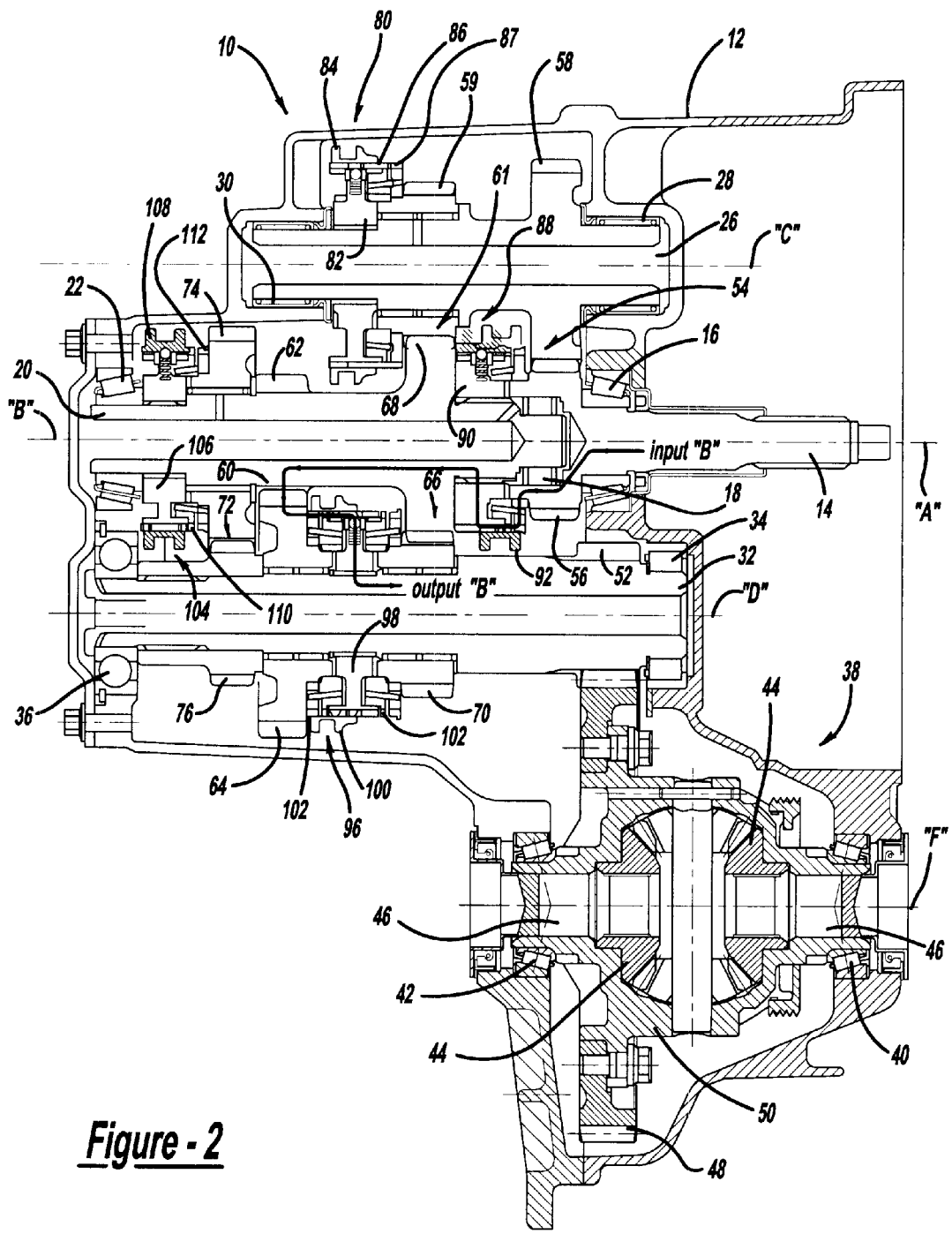
FIG. 2 is a sectional view of the six-speed manual transaxle constructed according to a preferred embodiment of the present invention illustrating the power flow in second gear.
Figure 3:
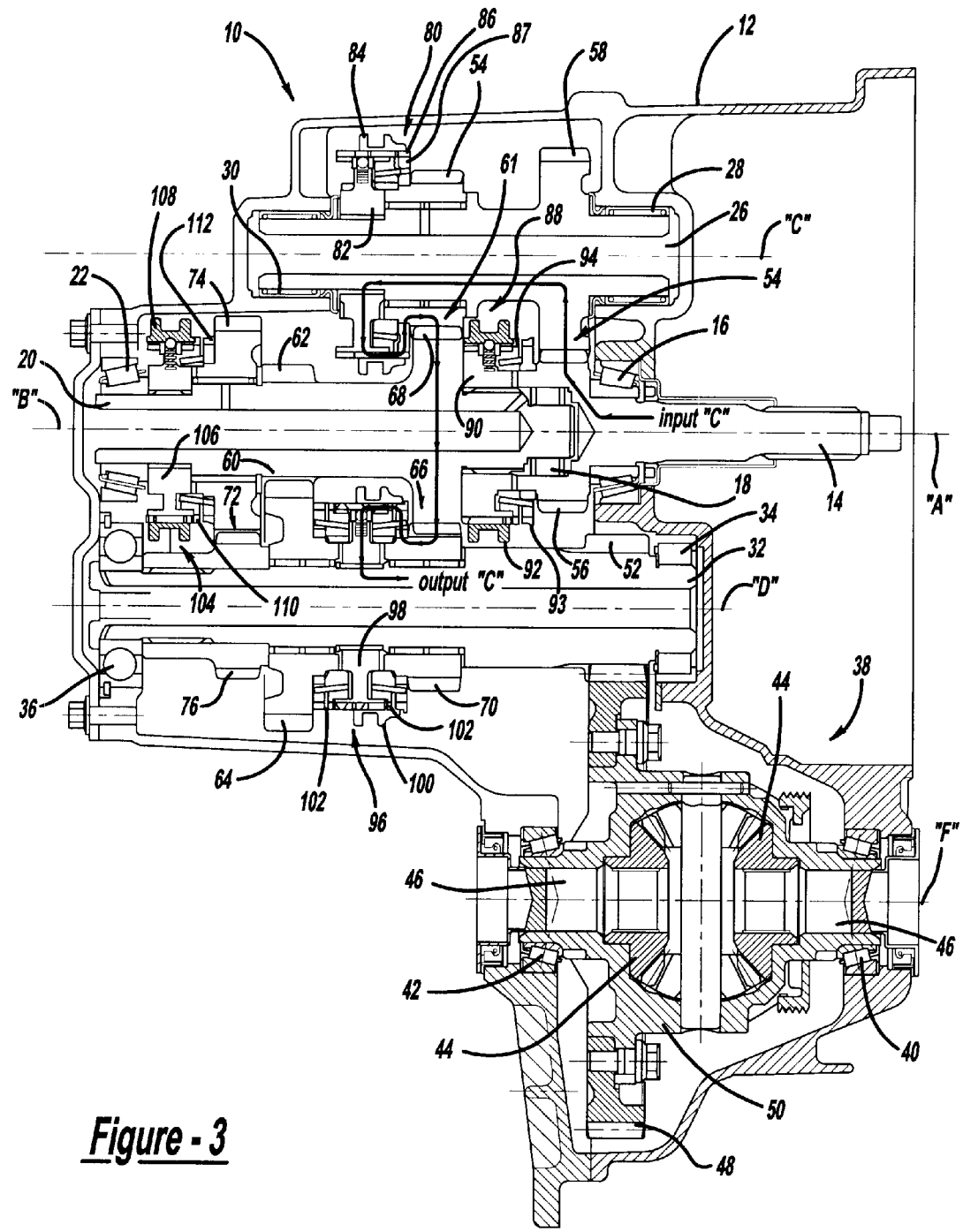
FIG. 3 is a sectional view of the six-speed manual transaxle constructed according to a preferred embodiment of the present invention illustrating the power flow in third gear.

In particular, a first synchronizer clutch 80 includes a hub 82 fixed to reduction shaft 26, a shift sleeve 84 mounted for rotation with and axial sliding movement on hub 82, and a synchronizer 86 interposed between shift sleeve 84 and a clutch gear 87 fixed to second reduction gear 59. First synchronizer clutch 80 is of the single-acting variety such that forward axial movement of shift sleeve 84 (shown in FIG. 1) from its central neutral position shown in FIG. 2 is adapted to releasably couple second reduction gear 59 to reduction shaft 26 for establishing the reduction gearset path. A second synchronizer clutch 88 includes a hub 90 fixed to mainshaft 20, a shift sleeve 92 mounted for rotation with and axial sliding movement on hub 90, and a synchronizer 94 interposed between shift sleeve 92 and a clutch gear 93 fixed to first transfer gear 56. Second synchronizer clutch 88 is of the single-acting variety such that forward axial movement of shift sleeve 92 (shown in FIG. 2) from its central neutral position shown in FIG. 1 is adapted to releasably couple input shaft 14 to mainshaft 20 for establishing the direct path.

Figure 4:
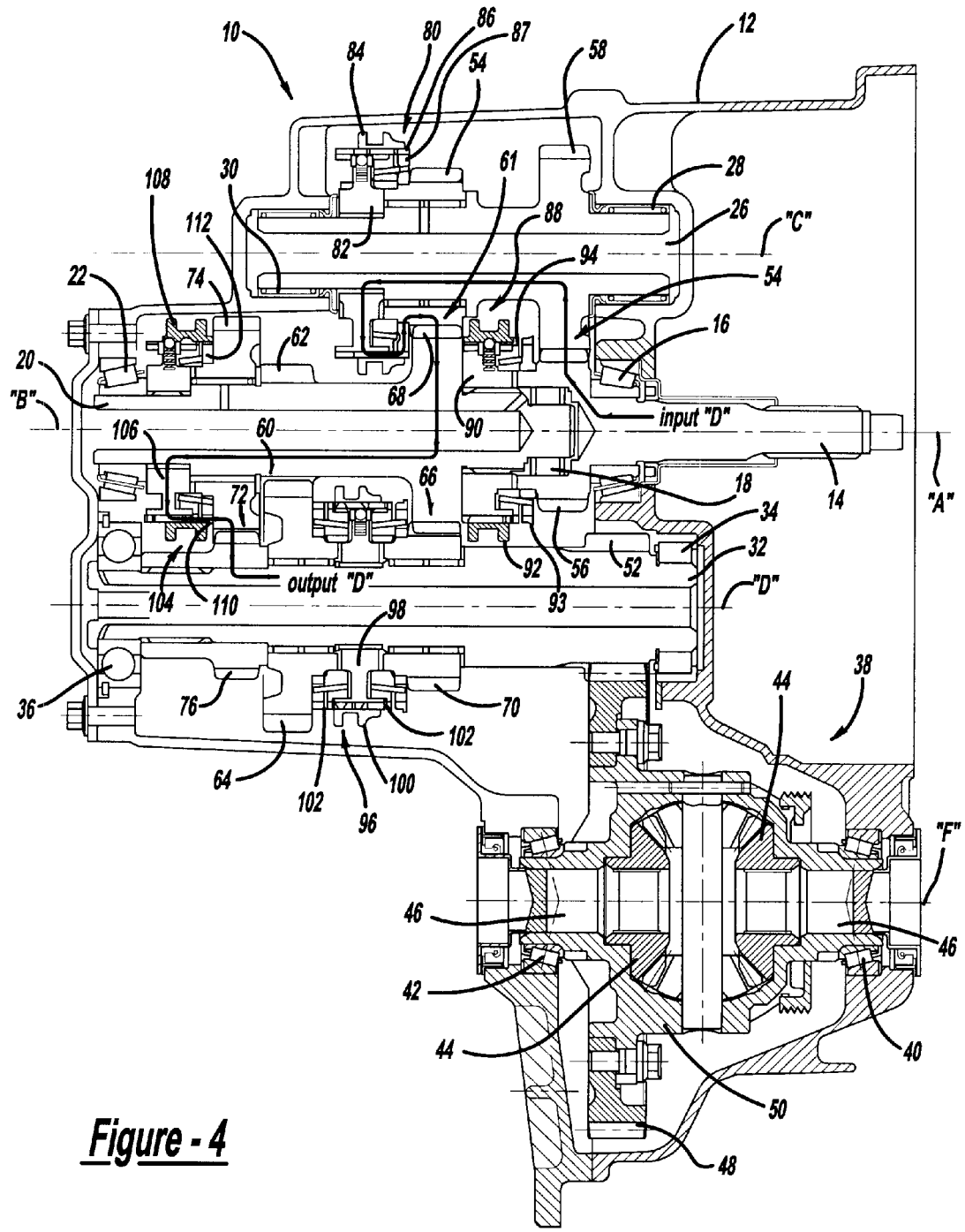
FIG. 4 is a sectional view of the six-speed manual transaxle constructed according to a preferred embodiment of the present invention illustrating the power flow in fourth gear.
Figure 5:
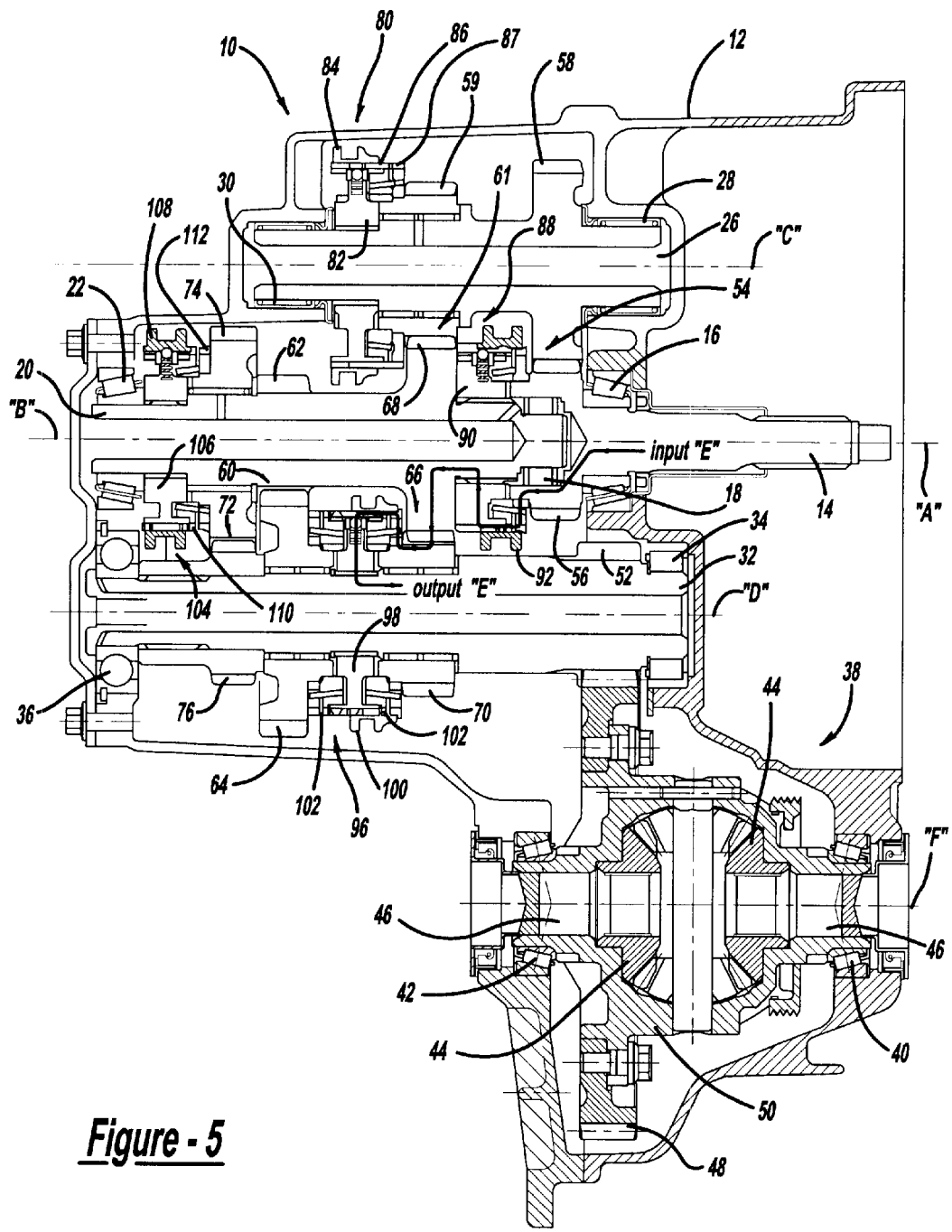
FIG. 5 is a sectional view of the six-speed manual transaxle constructed according to a preferred embodiment of the present invention illustrating the power flow in fifth gear.
Figure 6:
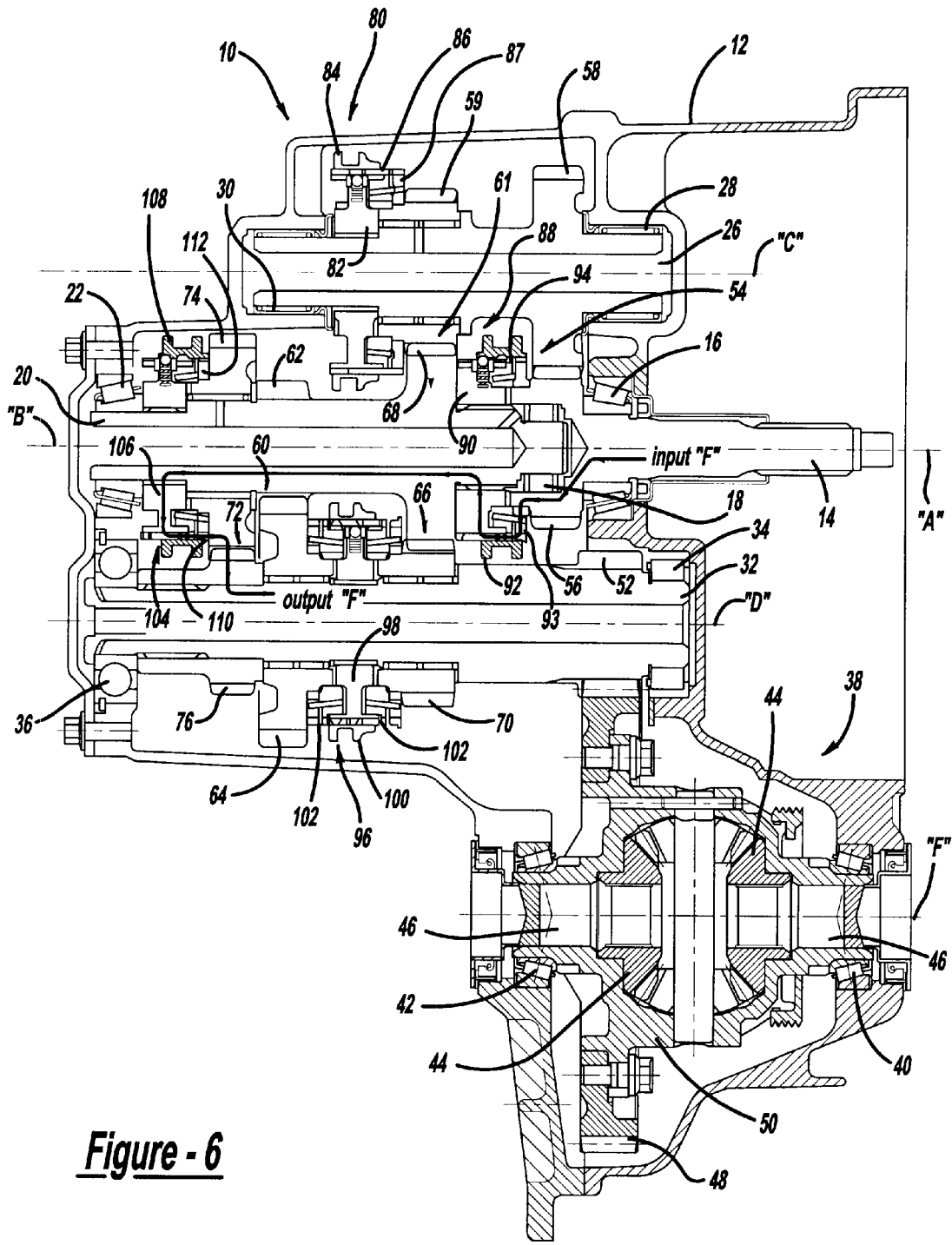
FIG. 6 is a sectional view of the six-speed manual transaxle constructed according to a preferred embodiment of the present invention illustrating the power flow in sixth gear.

To establish the various forward speed ratios, two additional synchronizer clutches are provided. A third synchronizer clutch 96 is operably located between first and second speed gears 64 and 70, and includes a hub 98 fixed to output shaft 32, a shift sleeve 100 mounted for rotation and axial sliding movement on hub 98, and a pair of synchronizers 102 interposed between shift sleeve 100 and speed gears 64 and 70. Third synchronizer clutch 96 is of the double-acting variety such that rearward axial movement of shift sleeve 100 (shown in FIGS. 1 and 2) from its central neutral position shown in FIG. 4 is adapted to releasably couple first speed gear 64 to output shaft 32 for defining the power transmission path and establishing the first and second forward speed ratios. Moreover, forward axial movement of shift sleeve 100 (shown in FIGS. 3 and 5) from its central neutral position is adapted to releasably couple second speed gear 70 to output shaft 32 for defining the power transmission path and establishing the third and fifth forward speed ratios.

Figure 7:
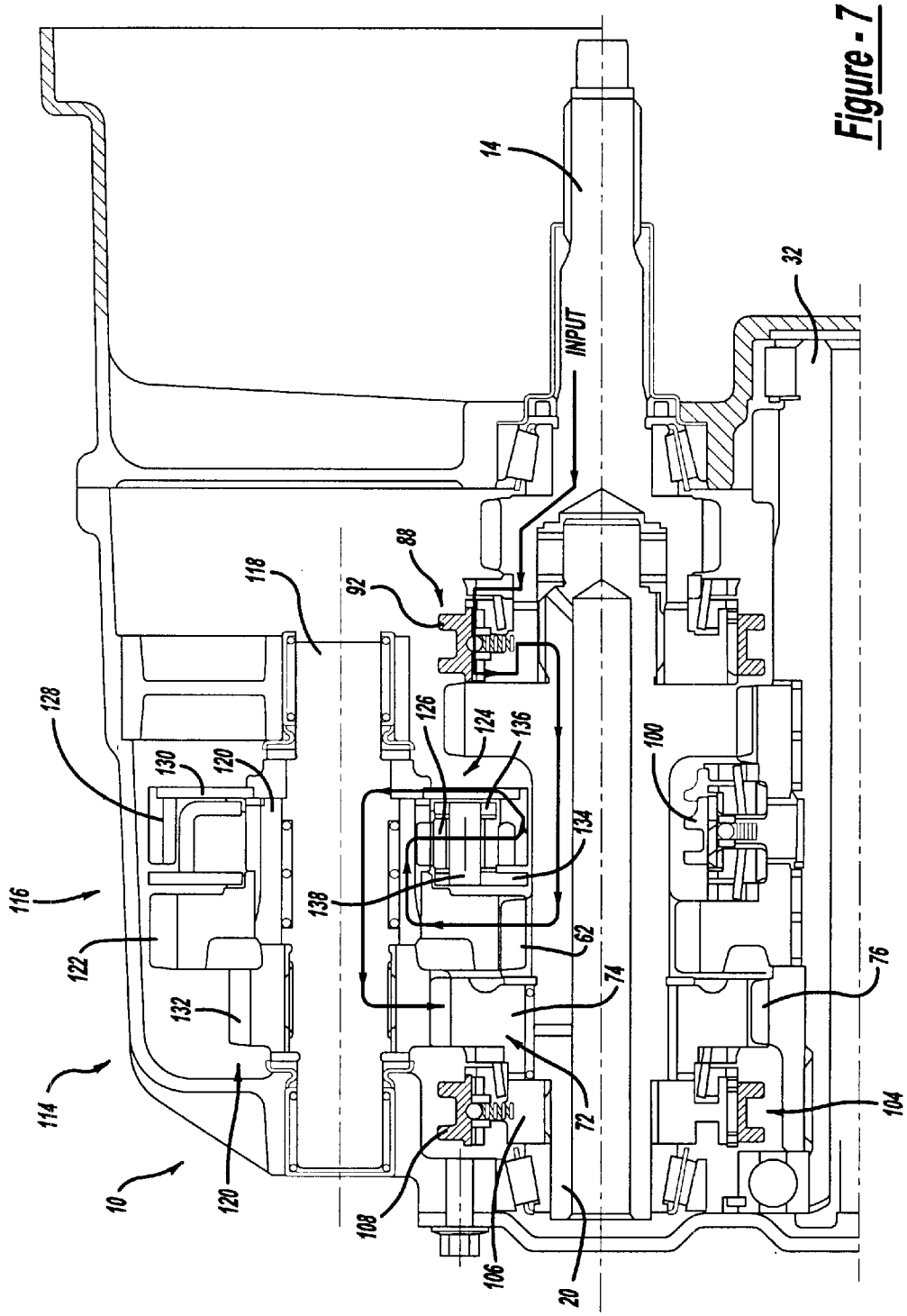
FIG. 7 is a table comparing synchronizer activation with gear initiation.

To establish the fourth and sixth forward speed ratios, a fourth synchronizer clutch 104 is located adjacent to third input gear 74 and includes a hub 106 fixed to mainshaft 20, a shift sleeve 108 mounted for rotation with and axial sliding movement on hub 106, and a synchronizer 110 interposed between shift sleeve 108 and a clutch gear 112 fixed to third input gear 74. Forward sliding movement of shift sleeve 108 (shown in FIGS. 4 and 6) from its centered neutral position shown in FIG. 1 is adapted to releasably couple third input gear 74 to output shaft 32 for defining the power transmission path and establishing the fourth and sixth forward speed ratios. In order to summarize the synchronizer clutches activation compared to the forward speed gear initiation, a table illustrated in FIG. 7 is provided.

When the first forward gear is established, drive torque is delivered from input shaft 14 to differential 38 through elements 56, 58, 26, 82, 84, 87, 59, 68, 20, 62, 64, 100, 98, 32, 52 and 48. This first path of the drive torque is illustrated by input arrow "A" and output arrow "A" in FIG. 1. When the second forward gear is established, drive torque is delivered from input shaft 14 to differential 38 through elements 93, 92, 90, 20, 62, 64, 100, 98, 32, 52 and 48. This second path of the drive torque is illustrated by input arrow "B" and output arrow "B" in FIG. 2. When the third forward gear is established, drive torque is delivered from input shaft 14 to differential 38 through elements 56, 58, 26, 82, 84, 87, 59, 68, 20, 68, 70, 100, 98, 32, 52 and 48. This third path of the drive torque is illustrated by input arrow "C" and output arrow "C" in FIG. 3. When the fourth forward gear is established, drive torque is delivered from input shaft 14 to differential 38 through elements 56, 58, 26, 82, 84, 87, 59, 68, 20, 106, 108, 112, 74, 76, 32, 52 and 48. This fourth path of the drive torque is illustrated by input arrow "D" and output arrow "D" in FIG. 4. When the fifth forward gear is established, drive torque is delivered from input shaft 14 to differential 38 through elements 93, 92, 90, 20, 68, 70, 100, 98, 32, 52 and 48. This fifth path of the drive torque is illustrated by input arrow "E" and output arrow "E" in FIG. 5. When the sixth forward gear is established, drive torque is delivered from input shaft 14 to differential 38 through elements 93, 92, 90, 20, 106, 108, 112, 74, 76, 32, 52 and 48. This sixth path of the drive torque is illustrated by input arrow "F" and output arrow "F" in FIG. 6. Likewise, a reverse gear assembly 114 can be selectively engaged for coupling mainshaft 20 to reduction shaft 26 to input shaft 14 to establish a reverse speed ratio (i.e., reverse gear).

Figures 8, 9:
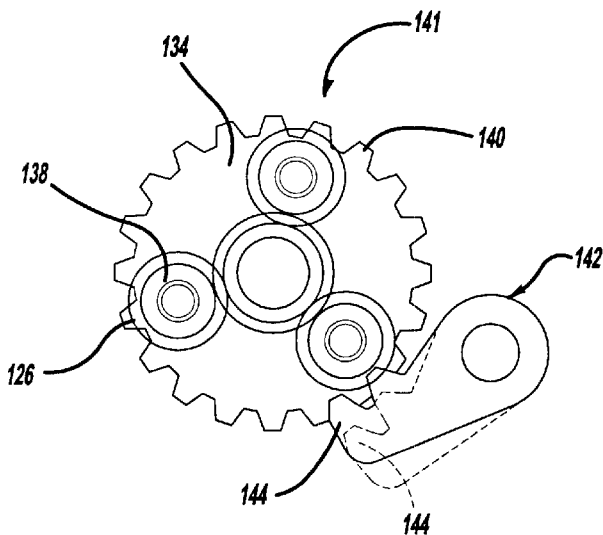
FIG. 8 is an enlarged partial view of the six-speed manual transaxle constructed according to a preferred embodiment of the present invention illustrating the components and power flow of the reverse gear assembly in greater detail.
FIG. 9 is a schematic representation of the locking mechanism and shift mechanism associated with the reverse gear assembly shown in FIG. 8.

Referring now to FIGS. 8 and 9, reverse gear assembly 114 is shown incorporated into manual transaxle 10. Reverse gear assembly 114 includes a planetary differential 116 disposed on a reverse shaft 118. Planetary differential 116 is a planetary gear assembly having a sun gear 120 driven by a reverse gearset including first input gear 62 fixed to mainshaft 20 and a first reverse gear 122 rotatably mounted on reverse shaft 118 and fixed for rotation with sun gear 120. First reverse gear 122 acts as an input to reverse gear assembly 114. A carrier assembly 124 supports a plurality of planet gears 126 in meshing engagement with sun gear 120. A ring gear 128 is in meshing engagement with planet gears 126. Ring gear 128 is fixedly attached for rotation with reverse shaft 118 by a hub portion 130. The reverse shaft 118 further includes a second reverse gear 132 in meshing engagement with third input gear 74 rotatably mounted to mainshaft 20. Second reverse gear 132 acts as an output for reverse gear assembly 114. Carrier assembly 124 includes a pair of carrier rings 134 and 136 which support a plurality of pinion shafts 138 (one shown) therebetween. Planet gears 126 are rotatably supported on each pinion shaft 138 and are in constant meshed engagement with sun gear 120 and ring gear 128. A series of locking teeth 140 are formed on the external surface of carrier ring 134.

Referring to FIG. 9, a locking mechanism 141 is shown to include a locking pawl 142 that is supported for pivotable movement between its first and second positions. With locking pawl 142 in the first position (shown in phantom), dog teeth 144 are displaced from carrier locking teeth 140 for permitting unrestricted rotation of carrier assembly 122. Locking pawl 142 is maintained in this first position when manual transaxle 10 is maintained in any one of its six forward gears. However, with locking pawl 142 in the second position, dog teeth 144 engage locking teeth 140 for braking rotation of carrier assembly 124, thereby reversing the direction of rotation of second reverse gear 132 relative to first reverse gear 122. Locking pawl 142 is moved to its second position for establishing the reverse gear with each of shift sleeves 84, 100 and 108 positioned in their non-engaged position while shift sleeve 92 is positioned in its engaged position.

In operation, when it is desired to shift manual transmission 10 into its reverse gear, locking mechanism 141 is shifted into its locked mode for moving locking pawl 142 to its second position. In this position, sun gear 120 is directly driven at a reduced speed and in the opposite direction as mainshaft 20. Due to carrier assembly 124 being held stationary, such rotation of sun gear 120 causes reverse shaft 118 to be driven in the opposite direction via planet gears 126 driving ring gear 128. Since second reverse gear 132 is fixed to reverse shaft 118, second reverse gear 132 causes third input gear 74 to also be rotatably driven which, in turn, drives third speed gear 76 and output shaft 32. Thus, output shaft 32 is driven through gearset 72 in the direction opposite to the direction it is normally driven during forward operation. Thus, when reverse gear is established, drive torque is delivered from input shaft 14 to differential 38 through elements 88, 20, 62, 122, 120, 126, 128, 118, 132, 74, 76, 32, 52 and 48. The reverse speed ratio is determined by the combination of input gear 62 driving first reverse gear 122, second reverse gear 132 driving gearset 72, and the gear geometry associated with reverse gear assembly 114.

It is also contemplated that locking mechanism 141 described above could be substituted with alternative arrangements that are operable for selectively braking rotation carrier assembly 124 such as, for example, conventional synchronizer clutches or band brakes. Moreover, an actuator can be provided that can be selectively actuated to stop rotation of carrier assembly 124 when manual transaxle 10 is shifted into its reverse gear. Such an actuator can be any mechanically, hydraulically, or electrically actuated clutch, brake or other suitable device capable of operation in a first mode for releasing carrier assembly 124 and in a second mode for inhibiting rotation of carrier assembly 124.

As the terms are used herein, all gears "rotatably supported" on a shaft are loosely mounted thereon using suitable bearings while all gears "fixed" to a shaft are non-rotatably mounted thereon via conventional means (i.e., splines, press-fit, welding, etc.) or are integrally formed thereon. Any suitable shift system that is operable for coupling each of shift sleeves 84, 92, 100 and 108 to a gearshift lever (not shown) to coordinate movement therebetween to establish the various forward and reverse gears can be used with manual transaxle 10. Moreover, the geartrain shown in manual transaxle 10 is arranged such that only one power transmission path is intended to be engaged at a time, with disengagement of all the power transmission paths establishing a neutral mode whereat no drive torque is transferred from input shaft 14 to output shaft 32.

The foregoing discussion discloses and describes preferred embodiments of the present invention. One skilled in the art will readily recognize from such discussion, and from the accompanying drawings and claims, that various changes, modifications and variations can be made therein without departing from the true spirit and fair scope of the invention as defined in the following claims. For example, the novel geartrain arrangements disclosed herein for use in the transaxles may likewise be used in a rear-wheel drive transmission wherein the differential would be removed and the output shaft would extend rearwardly for connection to the vehicle's rear driveline components.

What is claimed is:

1. A manual transmission comprising:

an input shaft;

a reduction shaft having a first reduction gear fixed thereto and a second reduction gear rotatably supported thereon;

a mainshaft;

an output shaft;

a first clutch for selectively coupling said input shaft to said mainshaft;

a second clutch for selectively coupling said second reduction gear to said reduction shaft;

a first input gear fixed to said mainshaft;

a first speed gear rotatably supported on said output shaft and meshed with said first input gear;

a second input gear fixed to said mainshaft;

a second speed gear rotatably supported on said output shaft and meshed with said second input gear;

a third clutch for selectively coupling either of said first and second speed gears to said output shaft;

a third input gear rotatably supported on said mainshaft;

a third speed gear fixed to said output shaft and meshed with said third input gear;

a fourth clutch for selectively coupling said third input gear to said mainshaft;

a first reverse gear rotatably supported on a reverse shaft and in driven connection with said mainshaft; and a second reverse gear fixed to said reverse shaft and in driving connection with said mainshaft.

2. The manual transmission of claim 1 wherein said driven connection between said first reverse gear and said mainshaft is established by said first reverse gear meshing with said first input gear.

3. The manual transmission of claim 1 wherein said driving connection between said second reverse gear and said mainshaft is established by said second reverse gear meshing with said third input gear.

4. The manual transmission of claim 1 further comprising a differential driven by said output shaft.

5. The manual transmission of claim 1 further comprising a planetary differential assembly interconnecting said first reverse gear and said second reverse gear for facilitating relative rotation therebetween.

6. The manual transmission of claim 5 further comprising a locking mechanism for selectively inhibiting rotation of a carrier assembly of said planetary differential so as to cause said output shaft to be driven in an opposite direction relative to normal forward gear operation for providing a reverse gear.

7. The manual transmission of claim 6 wherein said carrier assembly includes locking teeth, and wherein said locking mechanism includes a locking pawl having dog teeth, said locking pawl being selectively movable between a first position whereat said dog teeth are displaced from said locking teeth permitting rotation of said carrier assembly and a second position whereat said dog teeth engage said locking teeth for inhibiting rotation of said carrier assembly.

8. A manual transmission comprising:

an input shaft;

a reduction shaft having a first reduction gear fixed thereto and a second reduction gear rotatably supported thereon;

a mainshaft;

an output shaft;

a first clutch for selectively coupling said input shaft to said mainshaft;

a second clutch for selectively coupling said second reduction gear to said reduction shaft;

a first input gear fixed to said mainshaft;

a first speed gear rotatably supported on said output shaft and meshed with said first input gear;

a second input gear fixed to said mainshaft;

a second speed gear rotatably supported on said output shaft and meshed with said second input gear;

a third clutch for selectively coupling either of said first and second speed gears to said output shaft;

a third input gear rotatably supported on said mainshaft;

a third speed gear fixed to said output shaft and meshed with said third input gear;

a fourth clutch for selectively coupling said third input gear to said mainshaft; and a reverse gear assembly having an input rotatably driven by said first input gear, an output meshed with said third input gear, and a planetary differential assembly interconnecting said input to said output for facilitating relative rotation therebetween.

9. The manual transmission of claim 8 further comprising a differential driven by said output shaft.

10. The manual transmission of claim 8 further comprising a locking mechanism for selectively inhibiting rotation of a carrier assembly of said planetary differential so as to cause said output shaft to be driven in an opposite direction relative to normal forward gear operation for providing a reverse gear.

11. The manual transmission of claim 10 wherein an input includes a first reverse gear meshed with said first input gear, an output includes a second reverse gear meshed with said third input gear, and wherein said planetary differential assembly rotatably interconnects said first reverse gear and said second reverse gear for facilitating relative rotation therebetween.

12. The manual transmission of claim 11 wherein said input includes a first side gear fixed to said first reverse gear, said output includes a second side gear fixed to said second reverse gear, and said planetary differential assembly includes pinion gears meshed with each of said first and second side gears.

13. The manual transmission of claim 11 wherein said input includes a sun gear fixed to said first reverse gear and said carrier assembly supports a planet gear meshed with said sun gear.

14. The manual transmission of claim 8 wherein said locking mechanism is maintained in a released mode for permitting rotation of a carrier assembly of said planetary differential assembly when operating in a forward gear, and wherein said locking mechanism is shifted into a locked mode for inhibiting rotation of said carrier assembly to provide a reverse gear.

15. The manual transmission of claim 10 wherein said carrier assembly includes locking teeth, and wherein said locking mechanism includes a locking pawl having dog teeth, said locking pawl being selectively movable between a first position whereat said dog teeth are displaced from said locking teeth for permitting rotation of said carrier assembly and a second position whereat said dog teeth engage said locking teeth for inhibiting rotation of said carrier assembly.

16. A manual transmission comprising:

an input shaft;

a reduction shaft;

a reverse shaft;

a mainshaft;

an output shaft;

a first clutch for selectively coupling said input shaft to said mainshaft;

a second clutch for selectively coupling said second reduction gear to said reduction shaft;

first and second constant-mesh gearsets supported between said mainshaft and said output shaft;

a third constant-mesh gearset drivably connecting said reduction shaft to said output shaft;

a third clutch for selectively engaging either of said second and third gearsets for drivably connecting said mainshaft to said output shaft for establishing forward speed ratios;

a fourth clutch for selectively coupling said first gearset to said mainshaft; and a reverse gear assembly rotatably supported on said reverse shaft for establishing a reverse speed ratio between said input shaft and said output shaft.

17. The manual transmission of claim 16 wherein said second constant-mesh gearset includes a speed gear rotatably supported on said output shaft, an input gear fixed to said mainshaft and meshed with said speed gear and a reduction gear fixed to said reduction shaft.

18. The manual transmission of claim 16 further comprising a differential driven by said output shaft.

19. The manual transmission of claim 16 wherein said reverse gear assembly includes a carrier assembly and a locking mechanism for selectively inhibiting rotation of said carrier assembly so as to cause said output shaft to be driven in an opposite direction relative to said input shaft for providing a reverse gear.

20. The manual transmission of claim 19 wherein said carrier assembly includes locking teeth, and wherein said locking mechanism includes a locking pawl having dog teeth, said locking pawl being selectively movable between a first position whereat said dog teeth are displaced from said locking teeth permitting rotation of said carrier assembly and a second position whereat said dog teeth engage said locking teeth for inhibiting rotation of said carrier assembly.

21. A manual transmission comprising:

an input shaft;

a reduction shaft having a first reduction gear fixed thereto and a second reduction gear rotatably supported thereon;

a mainshaft;

an output shaft;

a first clutch for selectively coupling said input shaft to said mainshaft;

a second clutch for selectively coupling said second reduction gear to said reduction shaft;

a first gearset including a first input gear mounted to said mainshaft and a first speed gear mounted on said output shaft and meshed with said first input gear, one of said first input gear and said first speed gear being selectively engageable with its respective shaft to transmit torque through said first gearset;

a second gearset including a second input gear mounted to said mainshaft and a second speed gear mounted on said output shaft and meshed with said second input gear, one of said second input gear and said second speed gear being selectively engageable with its respective shaft to transmit torque through said second gearset;

a first reverse gear rotatably supported on a reverse shaft and in driven connection with said mainshaft; and a second reverse gear fixed to said reverse shaft and in driving connection with said mainshaft.

* * * * *